United States Patent [19]

Lam

[11] Patent Number: 5,019,855
[45] Date of Patent: May 28, 1991

[54] LINEAR SHUTTER AND METHOD TO ACHIEVE UNIFORM DENSITY OF IMAGE ELEMENTS OF A 3-D PHOTOGRAPH

[75] Inventor: Nicholas L. Lam, Quarry Bay, Hong Kong

[73] Assignee: Image Technology, Inc., Ga.

[21] Appl. No.: 395,498

[22] Filed: Aug. 17, 1989

[51] Int. Cl.$^5$ .............................................. G03B 27/32
[52] U.S. Cl. ........................................ 355/22; 354/115
[58] Field of Search ........................... 355/22, 33, 77; 354/112–117; 356/376; 352/86

[56] References Cited

U.S. PATENT DOCUMENTS 4,294,544 10/1981 Altschuler et al. ................. 356/376
4,852,972 8/1989 Wah Lo ................................ 355/22

Primary Examiner—Michael L. Gellner
Assistant Examiner—D. Rutledge
Attorney, Agent, or Firm—Harold L. Marquis

[57] ABSTRACT

A method and apparatus for achieving uniform density of image elements of a 3-D photograph by using a 3-D printer with a linear motion blade shutter which travels at varying speeds during printing a negative view to control the duration of exposure across the 3-D photograph. The scanning speed of the linear shutter is varied during the exposure of each of the 2-D negative views and is based upon the position of the 2-D negative view in relation to the field of illumination of the enlarging lens in order to compensate for the non-uniformity of illumination due to the vignetting effect.

15 Claims, 10 Drawing Sheets

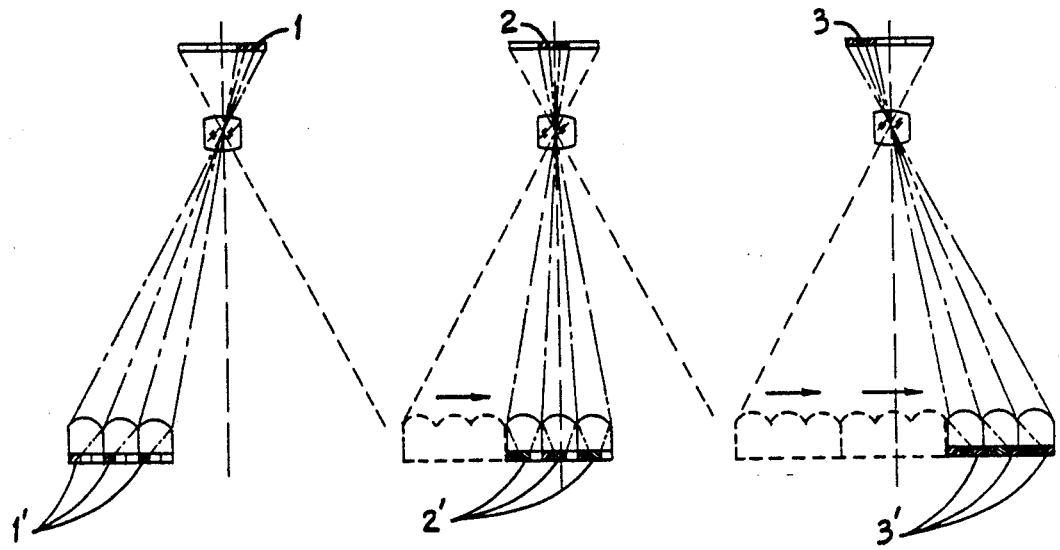
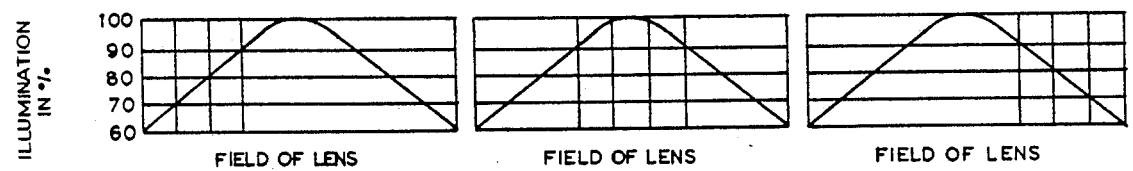
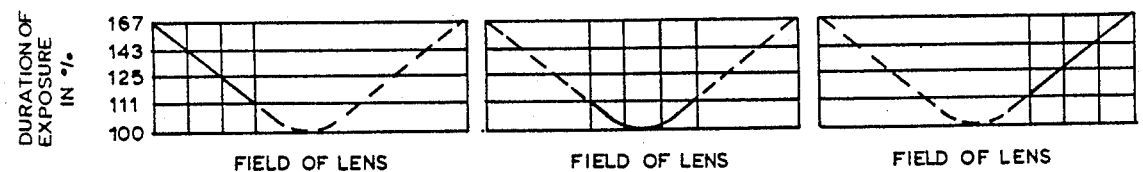
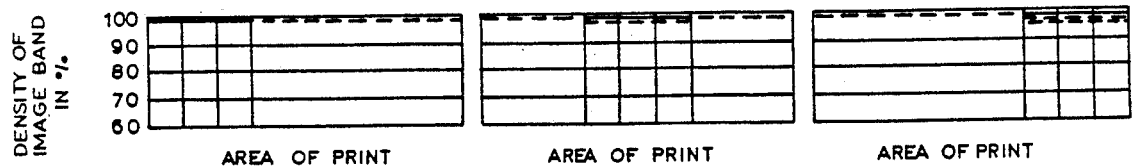
Fig 21

LINEAR SHUTTER AND METHOD TO ACHIEVE UNIFORM DENSITY OF IMAGE ELEMENTS OF A 3-D PHOTOGRAPH

BACKGROUND OF THE INVENTION

In lenticular type three-dimensional (3-D) photography, a plurality of two-dimensional (2-D) views of the scene are taken from a number of horizontally spaced vantage points and a series of 2-D images is then compressed and printed at the focal plane on the emulsion of each of the lenticules of the lenticular print film to form a 3-D composite image of the scene.

When a person is viewing a 3-D photograph, the right and left eyes see two image bands which form a stereo pair. The spatial parallax between the images of the stereo pair reconstructs the spatial effect and the sensation of depth to the photographed scene.

The method of taking and composing lenticular type 3-D photographs is explained in some of the following publications.

N. A. Valyus in *Stereoscopy* (The Focal Press 1962) at pages 195-205 discloses the basic method of taking and printing 3-D photographs on lenticular print material.

Rudolf Kingslake in *Applied Optics and Optical Engineering* (Academic Press 1965) at pages 108-116 also discusses some of the basic principles involved in lenticular three-dimensional photography.

Takanori Okoshi in *Three-Dimensional Imaging Technique* (Academic Press 1972) at pages 61-95 discusses a number of techniques for taking three-dimensional photographs.

The following U.S. Pat. Nos. are of interest in connection with three-dimensional photographic techniques.

3,895,867 (Lo et al)
4,059,354 (Lo et al)
4,101,210 (Lo et al)
4,132,468 (Lo et al)
4,468,115 (Lo et al)
4,120,562 (Lo et al)
3,482,913 (Glenn)
3,518,920 (Glenn)

In the composing of a lenticular type 3-D photograph, a plurality of 2-D negative views is simultaneously or sequentially projected through the lenticules of the 3-D print material to form groups of image elements of the 2-D negative view, each representing a different view of the photographic object. Each of the 2-D negative views is projected through a different angle of projection on to the 3-D print material. The total angle of projection is dependent upon the acceptance angle of the lenticule of the print material. Therefore each of the 2-D negative views is positioned at a different location in the field of the enlarging lens. Some of the negative views are positioned near the center of the field of the enlarging lens and some are positioned near the edge.

Due to the vignetting effect of the enlarging lens, the illumination is brighter at the center of the field and gradually decreases towards the edge of the field of the lens. Consequently the area of the 2-D negative views projected at the center of the field will receive maximum illumination and produce image bands of high density while the area of the 2-D negative views projected near the edge of the field will receive minimal illumination and produce image elements of lower density.

In the printing of 3-D photographs, there are plurality of image bands (corresponding to the total number of 2-D views) under each lenticule. In each image band a single or multiple condensed image element from a particular 2-D view is printed. If the width of the image element is smaller than the width of the image band, then the same 2-D view will be repeat printed several times so that each image band is formed by several image elements in order to fill the full width of the image band and not leave any unexposed spaces. Each of the image elements is exposed from a different angle of projection (to avoid overlapping of the image elements), which results in the image element exposed near the center of the field of the enlarging lens receiving more illumination than image elements toward the edge.

Since the image bands are generally made up of image elements which are exposed through different angles of the lenticules of the print material, the vignetting effect of the lenticules itself should also be compensated for in addition to the vignetting effect of the enlarging lens.

The vignetting of the enlarging lens and the lenticules of the print material results in density differences and also in color off balance between the image elements depending upon the angle of projection as some parts of the emulsion layer the lenticules are overexposed and other parts are underexposed. Differences in density and color balance are particularly acute when viewing a stereoscopic pair of images. This results in the observed phenomenon of the 3-D picture appearing to flicker when viewed from different viewing angles which makes the picture uncomfortable to view. The variations in density and color between each enlarged 2-d view is disconcerting to a viewer. The overall quality of the picture is decreased because the left and right eye each view an image of different density.

PRIOR ART

U.S. Pat. No. 3,852,787 (Nims et al) discloses a method of printing a series of 2-D negatives within image bands in a lenticule using a conventional single lens printer with a conventional shutter.

U.S. Pat. No. 3,895,867 (Lo et al) discloses the same printing process as disclosed in U.S. Pat. No. 3,852,787.

SUMMARY OF THE INVENTION

It is an object of the present invention to provide an apparatus and method to improve the quality of three-dimensional photographs. It is a particular object to provide an apparatus and method so that the entire area of each 2-D view negative is exposed at substantially equal exposure values regardless of the position of each 2-D view negative within the field of the enlarging lens or the angle of projection.

It is a further object to provide a method and apparatus to minimize color variation and the image flickering effect due to under and overexposure of the image element of various parts of the lenticular material.

These objects are achieved by using a printer with a variable speed linear motion blade shutter. A stepper or servo motor controls the aperture in the shutter blade and varies the direction and speed of shutter blade during the exposure of the 2-D negative views from different angles of projection and produces image elements of uniform density across the entire area of the 3-D print material.

A computer or microprocessor is programmed to control the speed, acceleration and deceleration of the linear motion blade shutter as it opens and travels across the negative being printed according to the illumination curve of the lens and position of the negative in the printer in order to compensate for the vignetting effect.

In a typical enlarging lens, the center of the field of illumination is brighter and gradually decreases towards the edge of the field. In general the linear motion shutter blade is opened and moves slower when printing at the edge of the field of the lens and moves faster when printing near the center of the field. The shutter speed is in proportion to the percentage of illumination of the enlarging lens at any particular location.

In order to produce high quality 3-D pictures it is necessary to expose the entire width of an image band with repeated images. This can be accomplished by exposing one element of the image band and then turning off the light and changing the projection angle by moving the lenticular print material and the enlarging lens to expose the adjacent element with the same image. This can be repeated until the entire image band is exposed. Because there are differences in the angle of projection of an image element from one edge of the image band to the other edge, the computer or microprocessor needs to be programmed to vary the duration of the exposure of each image element from one edge of the image band to the other edge. It is generally necessary to expose the image element at the edges of the image band farther from the center of the lenticule longer than those near the center. All of these variations can be programmed into the computer or microprocessor to control the speed of the linear motion blade shutter.

The aperture of the linear motion blade shutter can be a narrow slit or a larger rectangular aperture equal to one-half of the width of the negative or the field of the lens in which case the scanning takes place in one direction from one edge of the field to the other edge. The aperture of the shutter blade can be as large as the entire field of the lens in which case the scanning takes place in both directions (i.e., round trip) in order to complete an exposure.

The larger the aperture of the linear blade shutter, the shorter the exposure time that is required. A large aperture will expose a larger area of a negative at one time than a smaller aperture. Regardless of the size of the aperture, the exposure time required to expose a particular area of the 2-D negative view is the same and is dependent upon the percentage of illumination of that particular area of the field of the enlarging lens.

The exposure time required to expose an area of a 2-D negative view positioned at a particular area of the field of the enlarging lens can be calculated in accordance with the following equation.

$$E = \frac{X}{I} \quad (1)$$

wherein E is the required exposure time for a particular area of a negative offset from the center of the field of the lens, X is the standard exposure time of an area of a negative positioned at the center of the field of the lens where the illumination is 100%, and I is the illumination of a particular area of the field of illumination of the lens.

BRIEF DESCRIPTION OF THE DRAWINGS

FIG. 21 illustrates the computation of the duration of exposure of a variable linear motion shutter in printing a 3-D photograph.

DETAILED DESCRIPTION OF THE DRAWINGS

Figure 1:
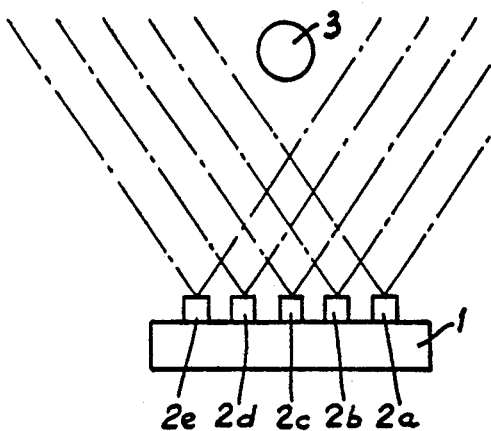
FIG. 1 is a diagrammatic view of a multi-lens camera exposing a negative to a plurality of 2-D views of an object.
Figure 2:
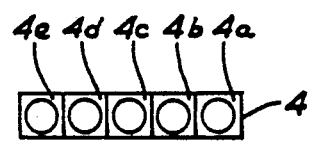
FIG. 2 is a diagrammatic view of a 2-D negative exposed by a multi-lens camera.

FIG. 1 illustrates a 3-D camera 1 with five lenses 2a-2e taking a photograph of an object 3. As each of the lenses 2a-2e is at a different location a slightly different view of the object is exposed on the negative 4 at frames 4a-4e as illustrated in FIG. 2.

Figure 3:
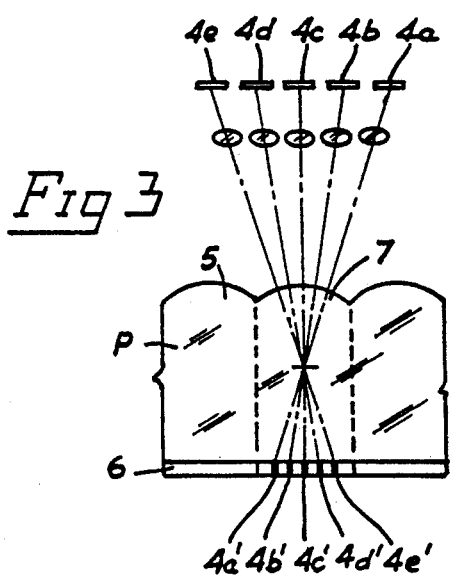
FIG. 3 is a diagrammatic view of the enlarging process showing the exposure of a plurality of 2-D views within a single lenticule of the lenticular print material.

In composing a 3-D photograph each negative 4 as illustrated in FIG. 3 is exposed by the lamp projector (not shown) resulting in the printing of an image element from each frame 4a-4e of the negative 4 onto the emulsion layer 6 of the print material P. An element of the images in negative 4 is exposed to the projection light and projected through the lenticular screen 5 and onto the emulsion layer 6. An element in negative frame 4a exposes the photosensitive emulsion 6 at location 4a'. An element in negatives 4b, c, d and e similarly expose a portion in the photosensitive emulsion 6 effectively at locations 4b', 4c', 4d' and 4e'. It should be noted that in this case the image elements do not fill the entire width of the lenticule 7 and certain portions of the emulsion layer 6 are unexposed.

Figure 4:
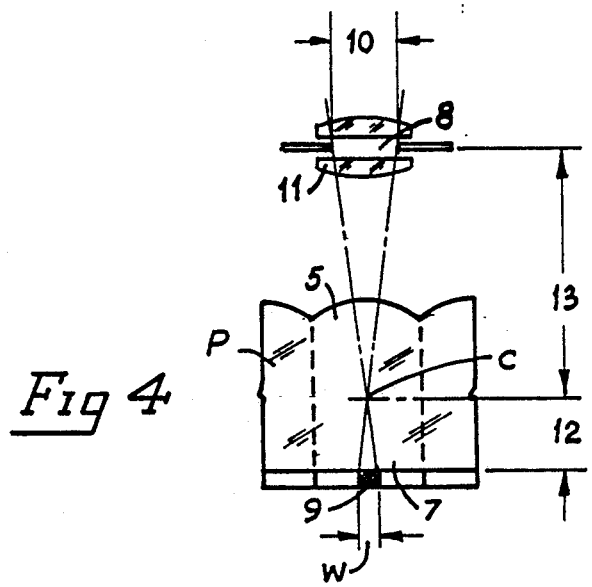
FIG. 4 is a diagrammatic view illustrating that the width of the image element is controlled by the width of the aperture of the enlarging lens, the distance from the enlarging lens to the center of curvature of the lenticule and the focal length of the lenticular print material.

FIG. 4 illustrates that the width w of the image element 9' is controlled by the width 10 of the aperture 8 of the enlarging lens 11, the focal length 12 of the print material P and the distance 13 from the enlarging lens 11 to the center of curvature C of the lenticule 7. These factors as illustrated in FIG. 4 produce an image element 9' that is relatively wide in relation to the width of the lenticule 7.

Figure 5:
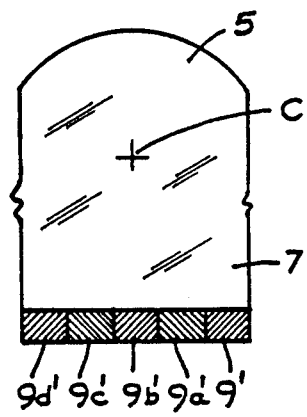
FIG. 5 is a diagrammatic view of a plurality of image bands within a lenticule of lenticular print material in which each image band is formed by a single image element.

FIG. 5 illustrates the situation where the width of an image element 9'-9d' is equal to the width of an image band 9'-9d'. The lens aperture and the distance from the lens to the enter of curvature C of lenticule 5 are selected so that the entire image element, 9', 9a', 9b', 9c' and 9d' is equal to the entire width of an image band.

Figure 6:
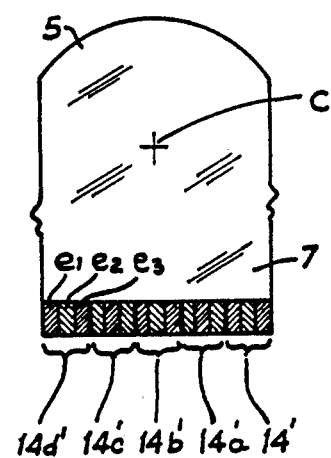
FIG. 6 is a diagrammatic view of a lenticule of lenticular print material in which each image element is smaller than the width of the image band and there are three elements within each image band.

FIG. 6 illustrates the situation where the aperture of the lens and the distance from the lens to the center of curvature C of lenticule 5 are selected so that there are three image elements $e_1$ $e_2$ and $e_3$ within each image band 14', 14a', 14b', 14c' and 14d'.

Figure 7:
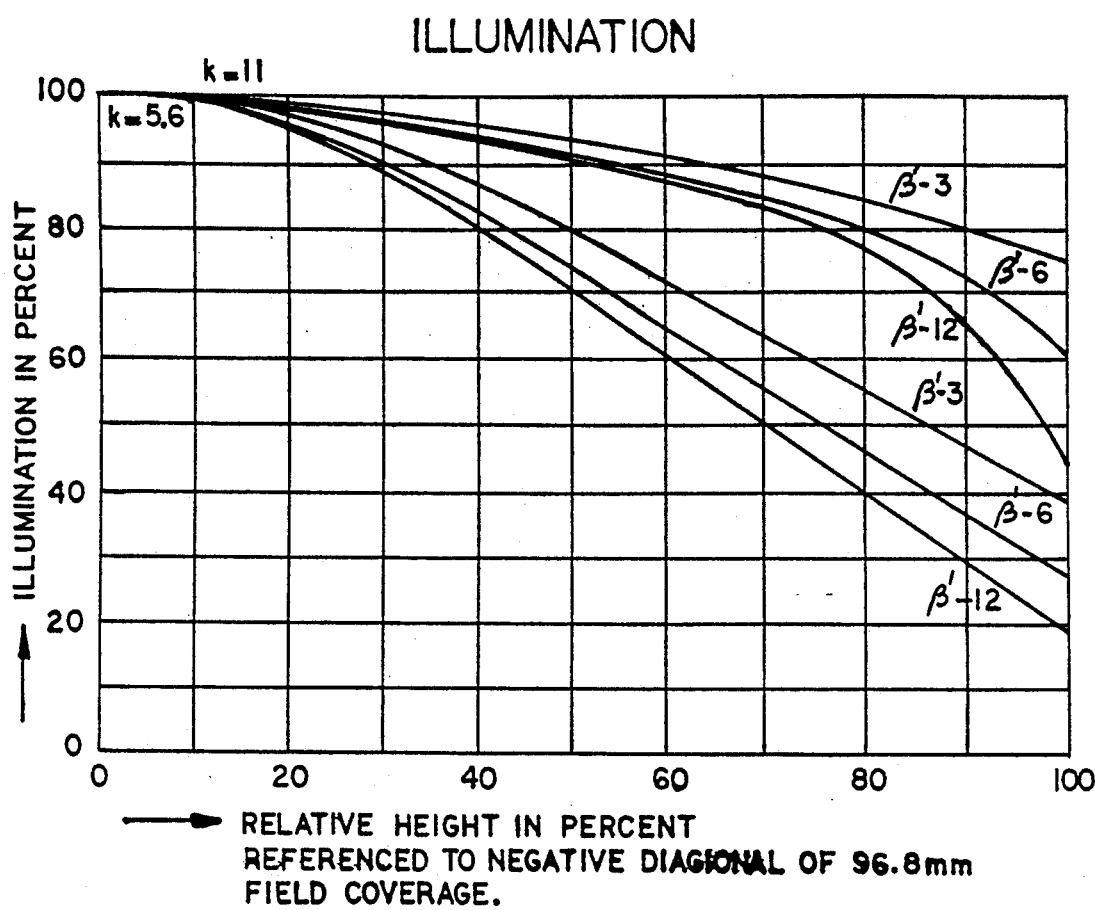
FIG. 7 is a graph showing the illumination characteristics of an enlarging lens at different aperture settings and magnification ratios.

FIG. 7 is a graph illustrating the illumination characteristics of a typical enlarging lens. The vertical axis shows the illumination percentage from 0-100%. The horizontal axis shows the distance from the center of the light cone to the edge, the center being at 0 and the maximum distance from the center being 100%. This illumination is referenced to a negative diagonal distance of 96.8 mm field of coverage. The amount of falloff in illumination varies depending upon the distance from the center and also upon the aperture setting K and magnification ratio M. Illumination falloffs have been plotted for aperture settings of 5.6 and 11 mm. It should be noted that the falloff is less with a higher aperture setting. The falloff in illumination is plotted for magnification ratios M of from 3 to 12 times the negative size. Falloff in illumination is greater with the increase in the magnification ratio.

Figure 8:
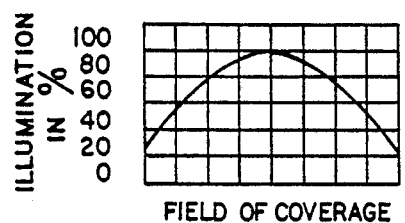
FIG. 8 is a graph which shows the illumination curve (due to the vignetting effect) across the full field of a typical enlarging lens on a projector.

FIG. 8 illustrates the illumination of the field of a typical enlarging lens on a printer from the right to the left side of the light cone. The vertical axis illustrates the degree of illumination in percentage from 0 to 100%. The horizontal axis represents the position of the light cone from the left to the right hand side of the cone. It will be noticed that the percent of illumination is much higher near the center of the light cone and falls off gradually and constantly towards each edge.

Figure 18:
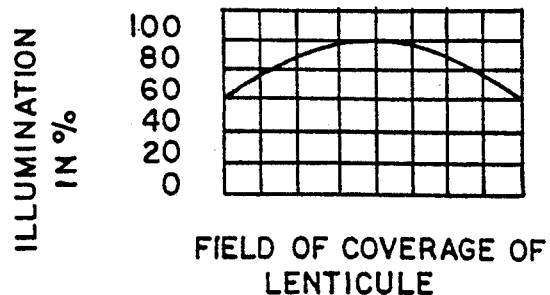
FIG. 18 is a graph which shows the illumination curve (due to the vignetting effect) across the full field of coverage of the lenticular screen of a lenticule.

FIG. 18 illustrates the illumination of the field of coverage of the lenticular screen of a lenticule. The vertical axis illustrates the degree of illumination as a percentage of from 0 to 100%. The horizontal axis represents the location in the emulsion layer of the lenticule from left to right. It will be noticed that the percentage of illumination is higher near the center of the lenticule and falls off gradually towards each edge in a manner similar to the graph in FIG. 8.

The cumulative effect of the vignetting effect of the enlarging lens and the lenticular screen results in a greater falloff in illumination from the center to the edge of the lenticule than what is illustrated in FIG. 8 or 18 alone.

Figure 12:
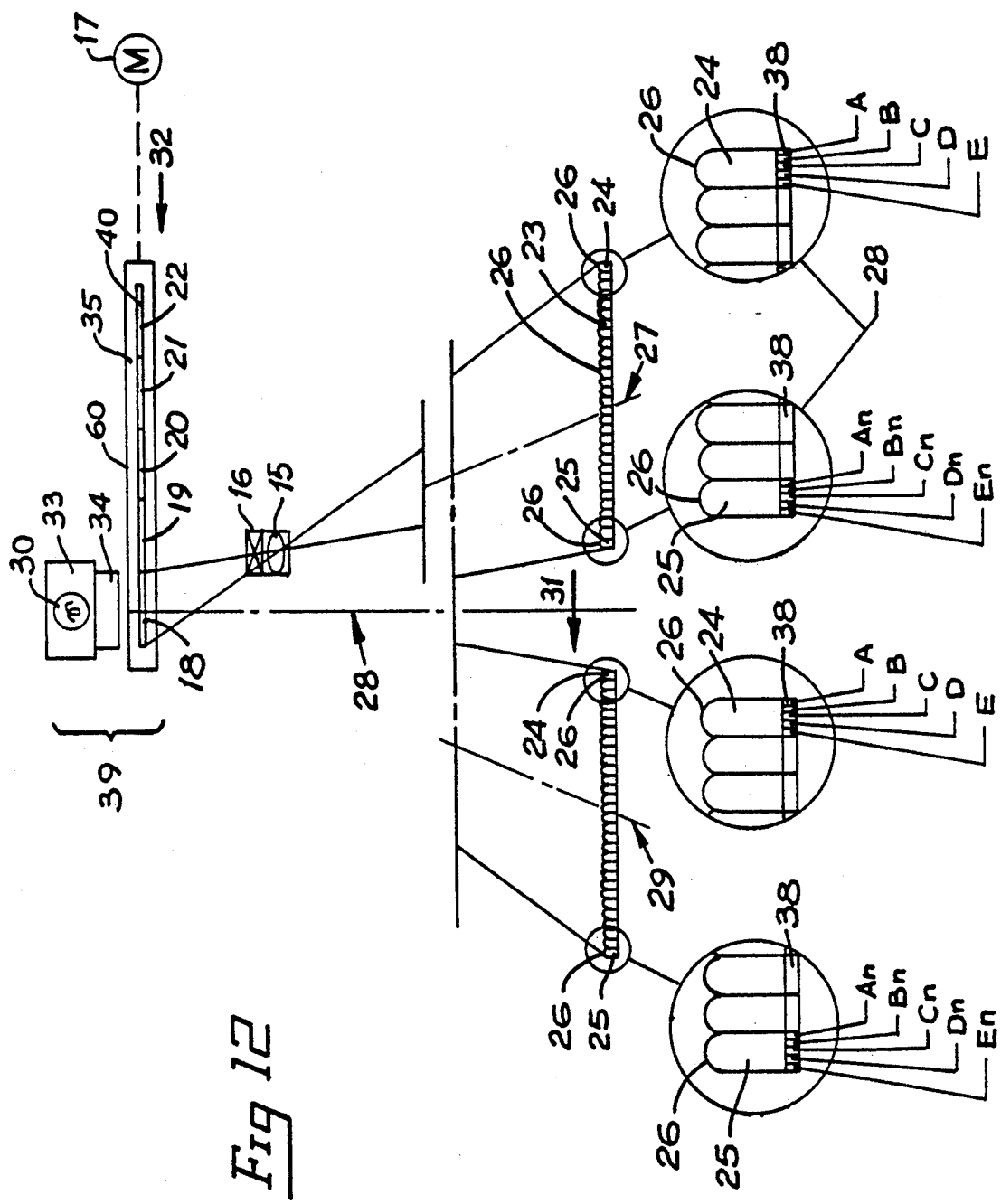
FIG. 12 is a diagrammatic view of a conventional 3-D enlarger printer illustrating the printing of lenticular print material.

FIG. 12 is a conventional 3-D enlarger printer. The printer 39 has a color lamp house 33, light gate 34, negative carrier 35 and a lens 15 and conventional shutter 16. A servo or stepper motor 17 is utilized for moving the negative carrier 35 to the proper position for each exposure.

The negative 40 consisting of negative frames 18-22 is illustrated in the negative carrier 35. Each negative frame 18-22 is projected through the enlarging lens 15 to the proper position on the lenticular print film 23. The lenticular print film consists of a plurality of lenticules as illustrated by 24 and 25. Each lenticule 24 and 25 as illustrated in the enlargements consist of a curved lenticular screen 26 and a light sensitive photographic emulsion 38. Each lenticule has five image bands A, B, C, D and E (corresponding to negative frame 18-22) in which one or more condensed images is printed.

FIG. 12 illustrates the printing of negative 18 onto the lenticular print material at position 27 and also illustrates the center line of the optical system 28. At this time each image band A to $A_n$ of each lenticule is filled with the image of negative 18. This is accomplished by turning on the lamp 30 in the lamp housing 33 and opening the shutter 16 which exposes each image band A to $A_n$ in all of the lenticules of the lenticular print material 23 at the same time.

The duration of exposure of all image bands A to $A_n$ in all of the lenticules is the same. Consequently, image band $A_n$ in lenticule 25 which is near the center of the optical system 28 receives more illumination than those near the edge such as image band A in lenticule 24. Therefore, image band $A_n$ in lenticule 25 is denser than image band A in lenticule 24.

Figure 16:
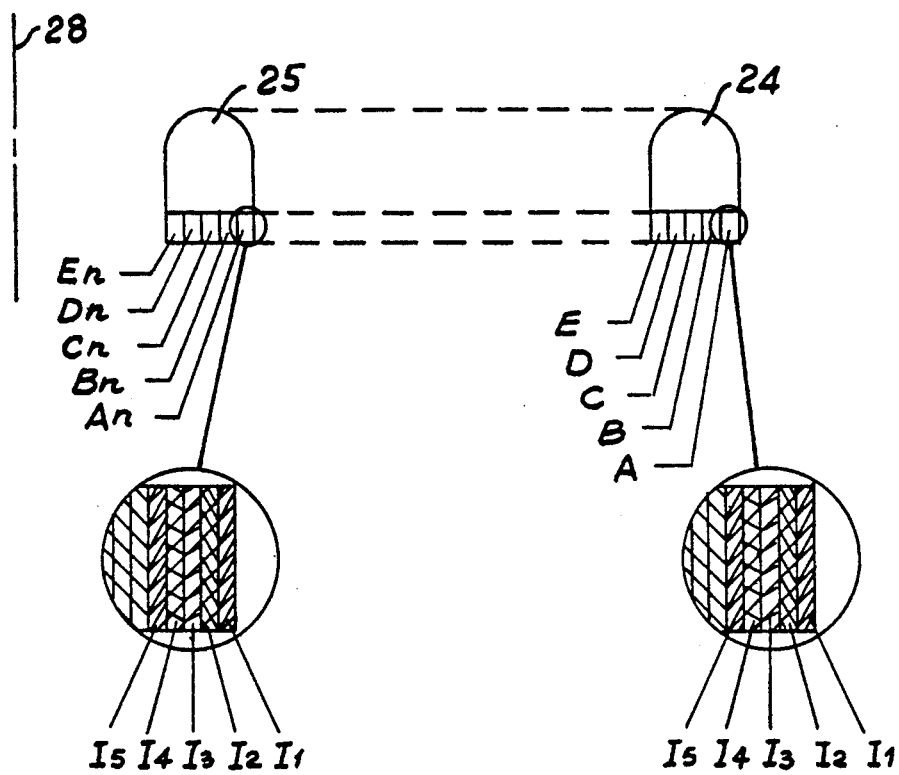
FIG. 16 is an enlargement of image band A of lenticule 24 and image band $A_n$ of lenticule 25 of the lenticular print material which has been printed at position 27 as illustrated in FIG. 12.

Because of the relatively narrow angle of projection through the lenticular screen 26 of the lenticule, only a portion of each image band will be exposed in normal 3-D practice. The image in negative 18 is projected several times in order to fill the entire image band A as illustrated in FIG. 16. FIG. 16 is an enlargement of image bands A and $A_n$ showing the image element repeated five times ($I_1$-$I_5$). The image elements $I_1$-$I_5$ can be repeated by continuously scanning by moving the enlarging lens 15 and the lenticular material 23 in the direction of arrow 31. This has been done in the past by continuously scanning in the direction of arrow 31 with the shutter 16 open and the lamp light 30 on. Better quality 3-D photographs are obtained by either turning the lamp 30 off or closing the shutter 16 during movement between adjacent positions.

FIG. 16 is an enlargement of image band A of lenticule 24 and image band $A_n$ of lenticule 25. The vignetting effect of the enlarging lens results in different illumination values between image band elements $I_1$-$I_5$ of lenticule 24. Image element $I_5$ is closer to the optical center 28 during an exposure than $I_1$. Thus $I_5$ receives more illumination and produces a slightly different image than its adjacent element $I_4$ and significantly more than image element $I_1$.

FIG. 16 also shows an enlargement of image band $A_n$ of lenticule 25. The same image elements $I_1$-$I_5$ are printed in image band $A_n$ of lenticule 25. In contrast to the density of the image elements $I_1$-$I_5$ in lenticule 24, images $I_1$-$I_5$ in lenticule 25 receive more illumination due to their location closer to the optical center during printing. As in the case of image band A in lenticule 24, image element $I_5$ of image band $A_n$ of lenticule 25 receives more illumination than the other image elements.

An additional factor that needs to be taken into account is the vignetting effect of the lenticular screen of the lenticules. Image bands that are near the center of the lenticule receive more illumination than those near the edge and consequently have denser images. The cumulative effect of the vignetting effect of the lens and the lenticule further decreases the density of the images at the edge of the lenticule.

As illustrated in FIG. 12, in printing negative frame 18, the servo motor 17 moves the negative carrier 35 in the direction of arrow 32 between printing image $I_1$ and $I_2$ so that the emulsion layer is in proper position for printing. The lenticular material 23 is also moved in the direction of arrow 31 to the proper position for printing. This process is repeated until image bands A to $A_n$ are filled with image elements $I_1$ to $I_5$.

The negative carrier 35 is moved in direction 32 to position negative frame 19 for printing onto image band B as illustrated in FIG. 12.

Figure 17:
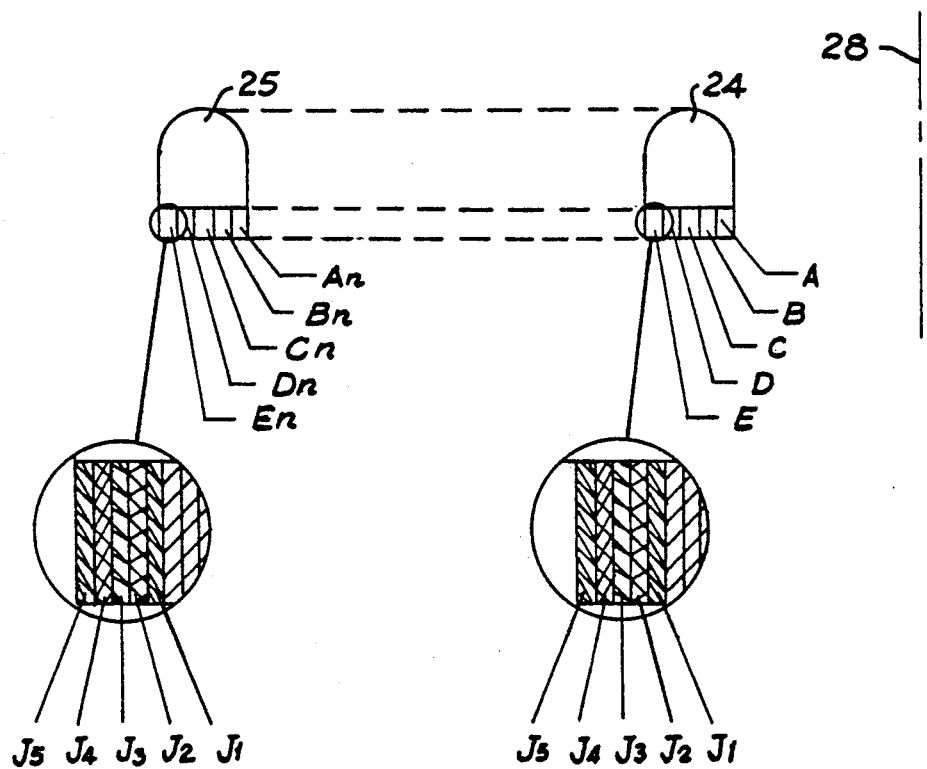
FIG. 17 is an enlargement of image band E of lenticule 24 and $E_n$ of lenticule 25 of the lenticular print material in which the printing is done at position 29 as illustrated in FIG. 12.

FIG. 17 shows the final stage of printing negative 22 onto print material 23 at position 29. In this case lenticule 24 receives more illumination than lenticule 25 because lenticule 24 is closer to the optical center 28 during the exposure process. Image element $J_1$ of image band E of lenticule 24 receives more illumination than image element $J_2$ and considerably more than image element $J_5$. This same difference is also true of the image elements in $E_n$ in that $J_1$ also receives more illumination than the other image elements in image band $E_n$. The cumulative effect of the vignetting effect of the lens and the lenticule further decreases the density of the images at the edge of the lenticules.

Figure 19:
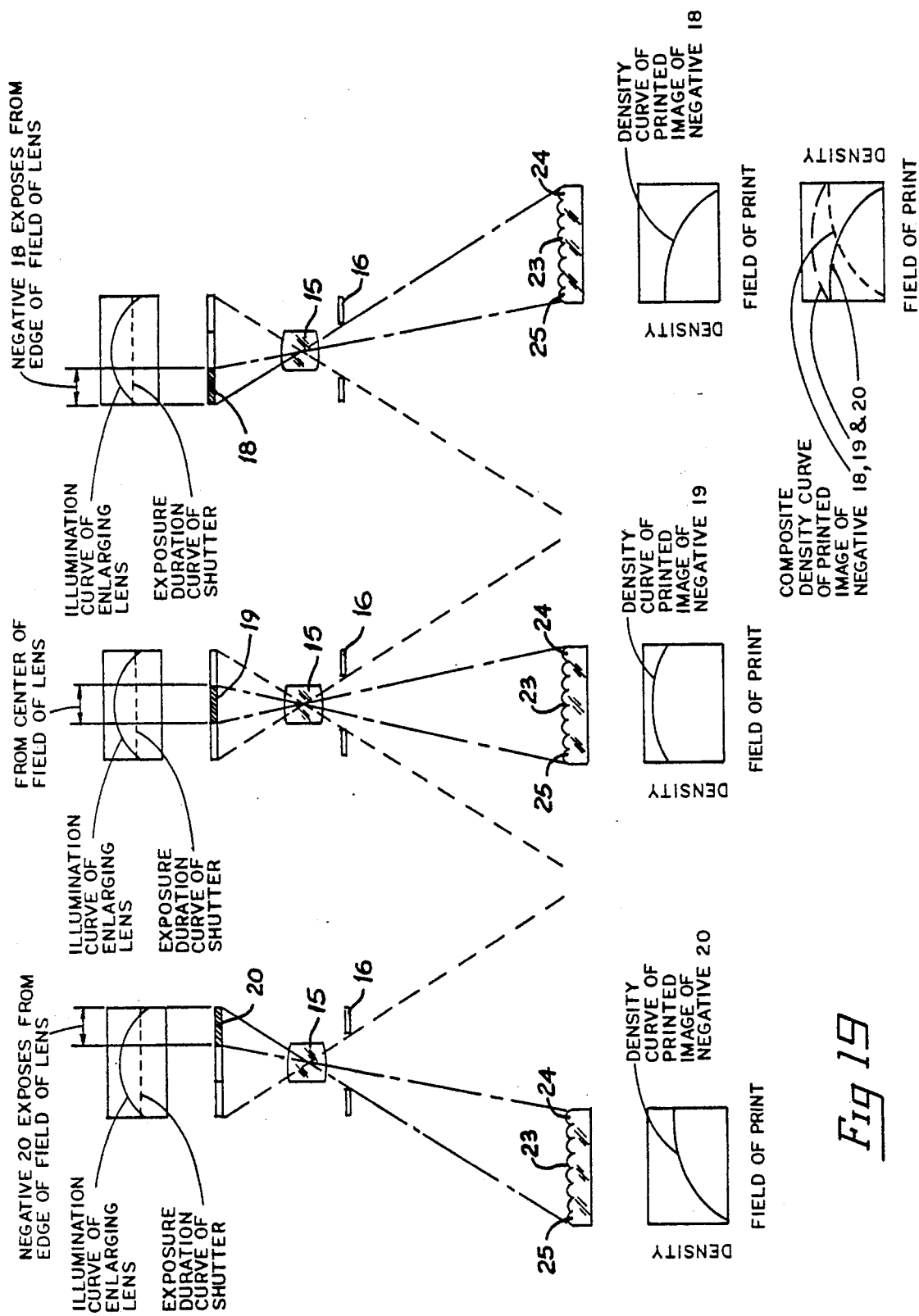
FIG. 19 is a diagrammatic view of a conventional 3-D printer illustrating the illumination curve of the enlarging lens and the density curve of the printed image.

FIG. 19 is a diagrammatic view of a conventional 3-D printer illustrating the printing of three negative views 18, 19 and 20. The printer has a conventional enlarging lens 15 and shutter 16. The illumination curve of the enlarging lens is illustrated in FIG. 8. As this is a conventional 3-D printer, the duration of exposure curve is the same in printing each of the views 18-20 as illustrated. The vignetting effect of the enlarging lens results in a different density curve in the printing of each of the views 18-20. The horizontal axis of the density curves graphs shows the field of print from left to right while the vertical axis illustrates the density of the printed image from 0 to 100%. It will be noticed that the vignetting effect of the lens results in the density curve of printed image number 18 being greatest near the left side of the photograph and falling off toward the right. As explained in connection with FIG. 12, 16 and 17, this is because the left side of the photograph is closer to the optical axis of the lens in printing view 18.

View 19 is printed at the optical center of the enlarging lens. Consequently, the density of the printed image is greater at the center of the photograph and falls off towards each edge due to the vignetting effect of the lens. As view 20 is printed to the left of the optical center of the lens, the density of the printed image is greatest to the right side of the photograph and falls off towards the left due to the vignetting effect of the lens. The composite density curves of the printed images of each of the views illustrates the variation in density at various locations on the photograph.

This vignetting effect results in stereo pairs of unequal density and color off balance. As explained in connection with FIGS. 16 and 17, the density differential between various images printed is increased by the vignetting effect of the lenticular screen of the lenticules.

Figure 13:
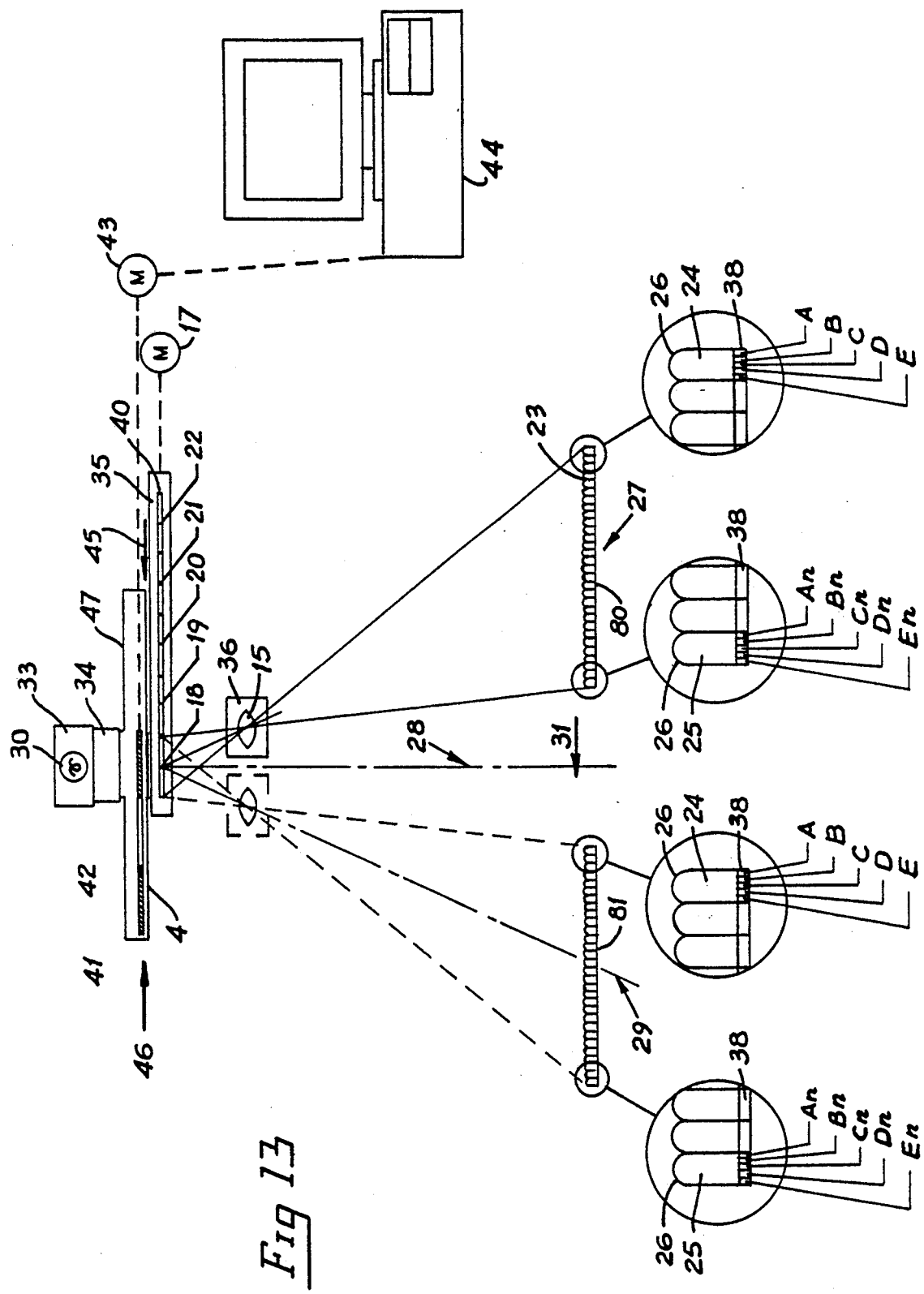
FIG. 13 is a diagrammatic view of an enlarger printer with a linear motion blade shutter with a variable speed control mechanism.

The density problem caused by vignetting and variations in the angle of projection been solved by the development of a linear motion blade shutter with a variable speed control mechanism as illustrated in FIG. 13. This printer is similar in basic construction to the printer illustrated in FIG. 12 and has a lamp house 33 with a lamp 30 and light gate 34 and a negative carrier 35 controlled by a servo motor 17 which moves the negative carrier to position negatives 18-22 in proper position for projection. It has a lens housing 36 in which lens 15 is placed. The printer has a shutter housing 47 containing a linear motion shutter blade 41 with an aperture 42. The shutter blade 41 is moved from the closed to the open position and closed again by the servo or stepping motor 43 which is controlled by a microprocessor or computer 44. The shutter blade 41 is a reciprocating blade which opens and closes when moving in the direction of arrow 46 and moves in the direction of arrow 45 to open and close again for the next exposure.

The computer or microprocessor 44 is programmed in order to equalize the illumination value between the exposure of each image element in each image band. The shutter blade 41 opens and accelerates slowly towards the center of negative 18 when printing image element $I_1$ in lenticule 24 and gradually accelerates towards the other edge of negative as the projection of the image approaches lenticule 25. The shutter blade opens slightly faster in printing $I_2$ of lenticule 24 than in the printing of $I_1$ of lenticule 24 as $I_2$ is closer to the optical center 28.

The vignetting effect of the lenticule can also be taken into account in programming the microprocessor or computer 44 to obtain image elements of equal density throughout the picture. The cumulative effect of these factors determines the speed of the shutter blade 41 at each location in printing each image element in each image band in each lenticule.

Conversely in printing in negative 22 as illustrated by FIG. 17, the shutter blade opens and accelerates somewhat more slowly in printing $J_2$ of lenticule 24 than in the printing of $J_1$ in lenticule 24.

In general, the length of duration of exposure of a negative is directly related to the illumination curve of the enlarging lens and the lenticule and the position of the negative in the printer in relation to the illumination curve. In general, the more acute the angle of projection the greater duration of exposure that is required. The speed of the shutter is slower near the edge of the field of the enlarging lens and faster near the center of the field of the enlarging lens in printing of a negative.

Figure 20:
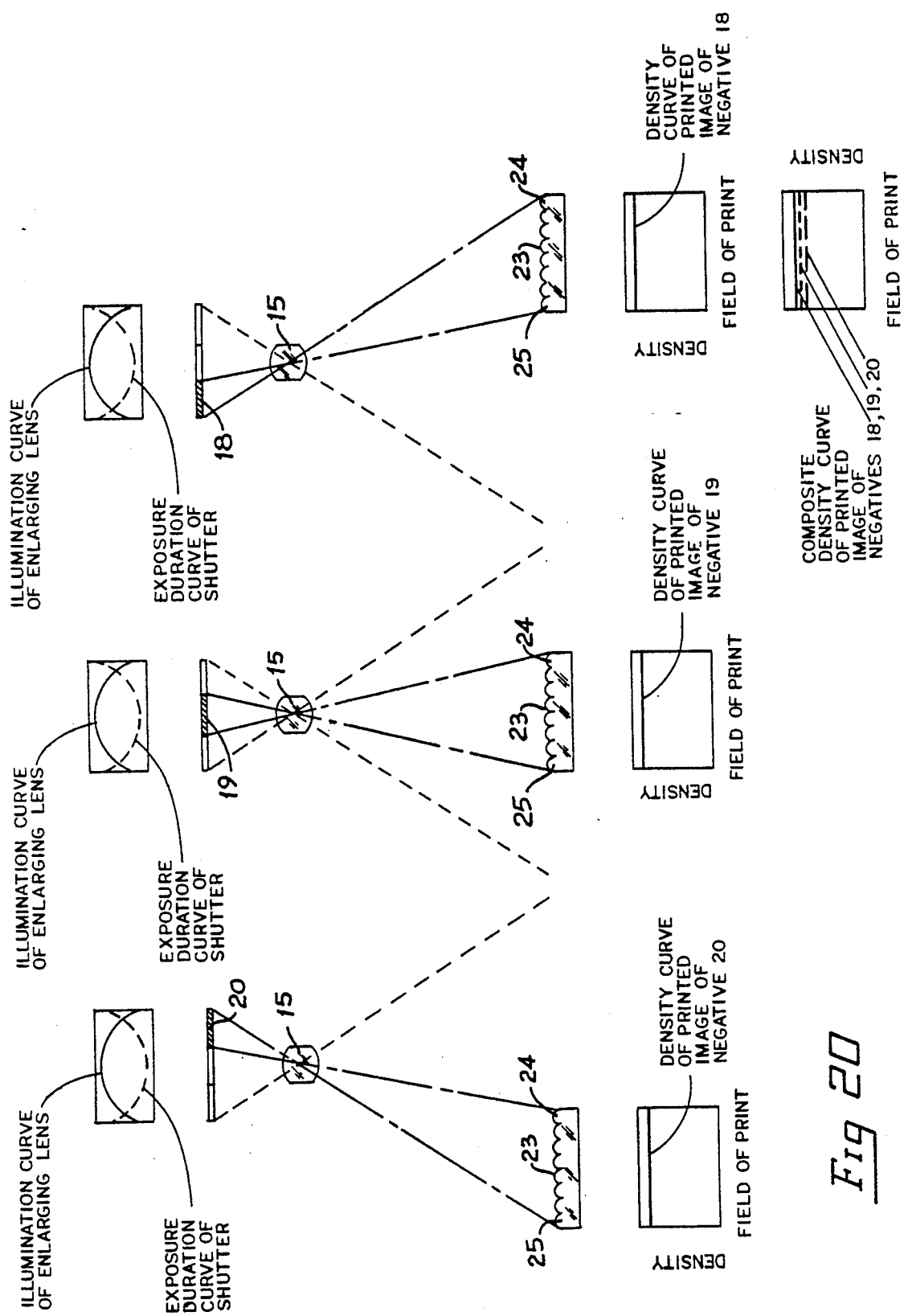
FIG. 20 is a diagrammatic view of the linear motion blade printer with a variable speed control mechanism showing the illumination curve of the lens and exposure curve required to achieve uniform density images across the photograph.

To illustrate these principles, when printing negative 18 at position 27 as illustrated in FIG. 16 the shutter opens in direction 46 and accelerates slowly from the edge of negative 18 in printing image element I₁ in image band A and gradually accelerates as the projection of the image approaches lenticule 25 (FIG. 13). Negative 18 is printed at one edge of the field of illumination of the lens as illustrated in FIG. 20. The shutter blade then will move more rapidly as I₁ is printed in lenticule 25 as it is closer to the optical center of the enlarging lens.

In printing the next image element I₂ as illustrated in FIG. 16, the print material 23 and lens 15 is moved in direction 31. The shutter blade 41 is opened in direction 46 from the initial position. In this case during printing the shutter blade accelerates more quickly than in the printing of image element I₁ because the angle of projection is slightly less acute and the print material to be exposed is slightly closer to the center of the light cone. In printing I₃, the lenticular print material 23 is moved in the direction 31 to repeat this intermittent projection process until image band A is filled. The speed of the shutter blade 41 varies according to the exposure time required for even exposure value.

The above explanation is based upon the linear blade shutter only travelling in direction 46 as it opens. After printing a view the light 30 is then turned off and the shutter blade is moved in direction 45 to its initial position in preparation of printing the next view. As this is a reciprocating blade shutter, it is not necessary to return the shutter 41 to its initial position between printing views. Rather the shutter can be moved in direction 46 to print one view and moved in direction 45 to print the next view. The above explanation was based upon only moving the shutter blade in direction 46 in order the simplify the explanation.

Figure 14:
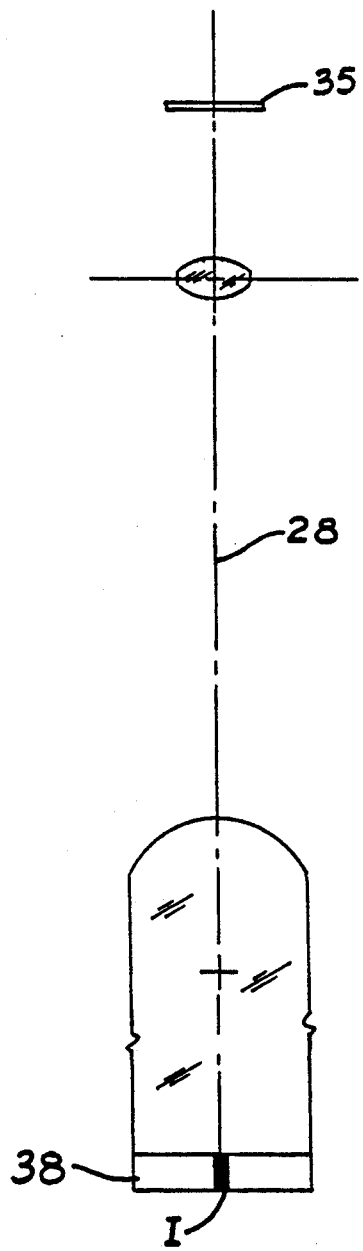
FIG. 14 is a diagrammatic view of the printing process illustrating the negative at the center of the field of the lens.

FIG. 14 is a diagrammatic view of the printing process illustrating the negative at the center of the field of lens. Under these circumstances the line of projection 28 intersects the lenticular screen 26 and the emulsion layer 38 in a perpendicular direction.

Figure 15:
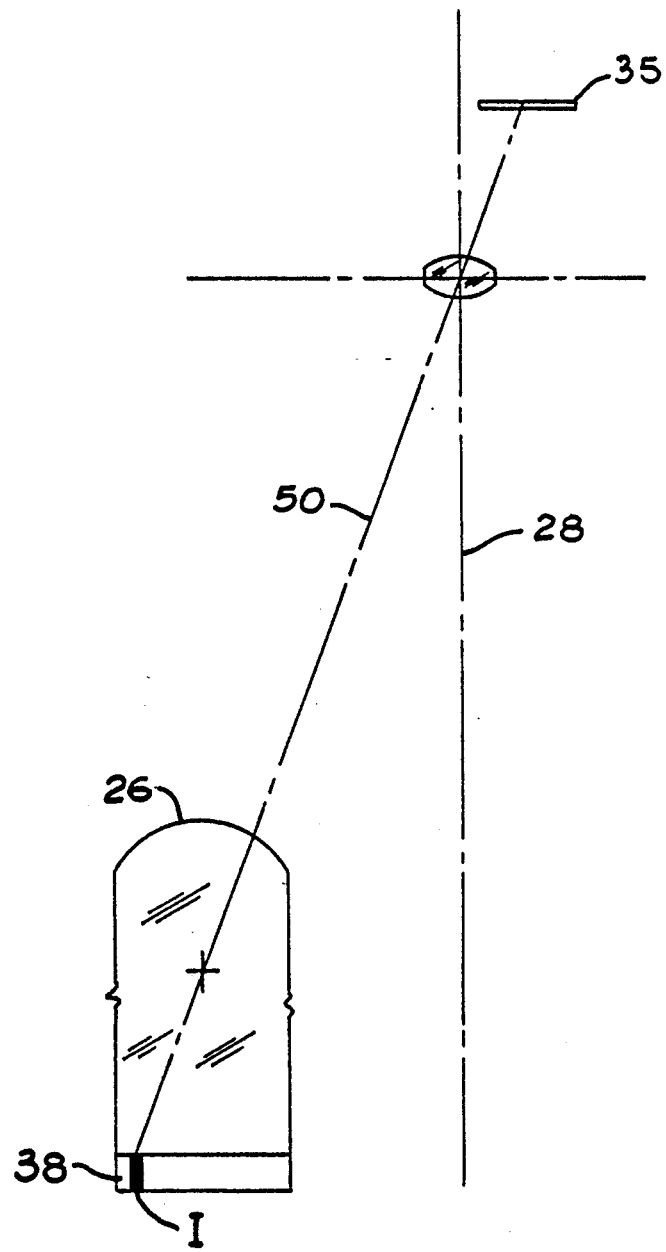
FIG. 15 is a diagrammatic view of the printing process illustrating the negative at the edge of the field of the lens.

FIG. 15 is a diagrammatic view of the printing process illustrating the negative 35 at the edge of the field of the lens. In this case the line of projection 50 is not co-extensive with the optical center of the lens 28. The line of projection intersects the lenticular screen 26 and the lenticular print material at an acute angle. In order for I₁ in FIG. 15 to be equally dense with image element I in FIG. 14, a longer duration of exposure is required in printing image I'.

Figure 9:
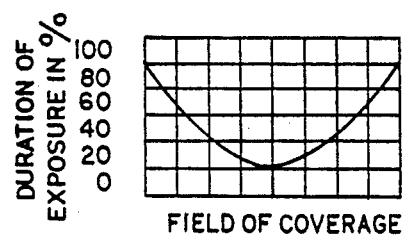
FIG. 9 is a graph which shows the exposure curve for the printing of a 3-D photograph in order to compensate for the illumination deficiency of the enlarging lens due to the vignetting effect.

FIG. 9 is a graph which shows the desired exposure curve to compensate for the vignetting effect of the lens as shown in FIG. 8. A longer exposure time is required at the edges of the field of coverage of the lens than near the center. The vertical axis illustrates the duration of exposure in percentage while the horizontal axis illustrates the field of coverage of the lens. It will be noticed that this curve is the reciprocal of the curve illustrated in FIG. 8 which is necessary to compensate for the vignetting effect of the lens.

Figure 11:
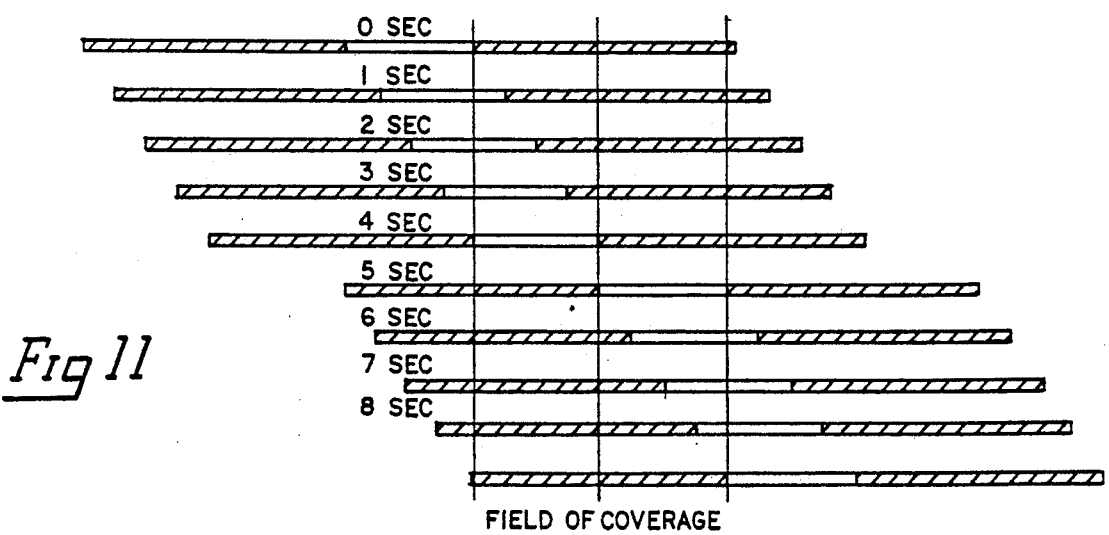
FIG. 11 is a diagrammatic view of a linear blade shutter showing its relative position during the exposure of a 2-D view.

FIG. 11 is a diagrammatic view of a linear blade shutter showing its relative position during the exposure of a 2-D view. The top part of the FIGURE illustrates the shutter moving from left to center of the field of the enlarging lens. The bottom half of FIG. 11 illustrates the linear blade shutter moving from the center of the field of the lens to right with the total exposure time at both edges of the field being four seconds and only one second at the field center. This variation in the speed of the shutter corresponds to the exposure time illustrated in FIG. 9 to compensate for the vignetting effect of the lens.

Figure 10:
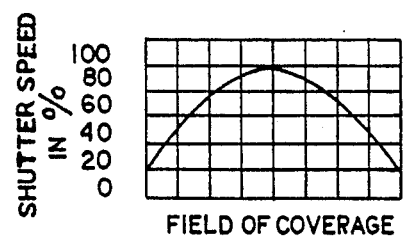
FIG. 10 is a graph illustrating the relative speed of a linear motion blade shutter necessary to compensate for the illumination deficiencies in a typical enlarging lens.

FIG. 10 is a graph illustrating the relative speed of a linear motion blade shutter necessary to compensate for the illumination deficiencies in a typical enlarging lens due to the vignetting effect. The horizontal axis represents the field of coverage of the enlarging lens. The vertical axis represents the scanning speed in percentage. It will be noticed that the scanning speed is faster near the center of the field and increases constantly towards the edge.

FIG. 20 illustrates the printing of three negative views 18–20 with a printer with a variable speed linear blade shutter. The illumination curve of the enlarging lens is identical to the illumination curve illustrated in FIG. 19. The duration of exposure curve is the reciprocal of the illumination curve of the enlarging lens as illustrated in FIG. 20 at the position in the printer at which the negative view is printed. For example in printing negative view 18 the linear shutter blade 41 opens in direction 46 (FIG. 13) and accelerates slowly towards the center of negative 18 and gradually accelerates towards the other edge of the negative as the projection of the image approaches lenticule 25. This results in a density curve that is uniform across the photograph in printing negative view 18. Printing of negative view 19 is done at the optical center of the lens. Consequently the shutter blade 41 opens and accelerates more rapidly towards the center of the negative than in the printing of negative 18. Shutter blade 41 also travels more rapidly as it approaches lenticule 25 than in the printing of negative view 18. In printing negative view 20, the shutter blade opens and accelerates fairly rapidly towards the center of the negative and travels more slowly as it reaches lenticule 25.

By programming the computer or microprocessor to properly vary the shutter speed, images of similar density across the photograph can be obtained.

FIG. 21 illustrates computation of the duration of exposure of a variable linear motion shutter in printing a 3-D photograph. The exposure time required to expose an area of a 2-D negative view positioned at a particular area of the field of the enlarging lens can be calculated in accordance with the following equation:

$$E = \frac{X}{I}$$

wherein E is the required exposure time for a particular area of a negative offset from the center of the field of the lens, X is the standard exposure time of an area of a negative positioned at the center of the field of the lens where the illumination is 100% and I is the illumination of a particular area of the field of illumination of the lens. Computations utilizing this formula are set forth in Examples 1 and 2. The results of computations using this formula are graphically illustrated in FIG. 21. FIG. 21 illustrates the printing of three negatives at different fields of view of the lens. The illumination values for printing each of these negative views at the center and at the edges of the photograph are set forth in a table. The duration of exposure in order to achieve equal density bands is also shown in the table. The illumination curve of the enlarging lens is illustrated as well as the duration of exposure and the density of the area of print that is obtained at the center and at the edges of the photograph. These computations do not take into account the vignetting effect of the lenticule. Consequently the exposure times can be adjusted somewhat to take this into account.

The image bands illustrated in FIG. 16 and 17 are indicated as being of equal width. However it should be understood that the image bands at the center of the lenticule can be significantly wider than those at the edge. Conversely the image bands at the edge of the lenticule can be narrower than those at the center. An image must be repeated more times in a wide image band than in a narrow image band.

By programming all of these variables into the computer or microprocessor, the shutter blade can be opened and closed at variable speeds and in different directions so that the illumination value on each repeated image in all of the image bands is substantially identical. This results in the images having identical density and reduces the color distortion in the picture.

EXAMPLE 1

A 2-D negative view is to be exposed midway between the center and the edge of the field of the enlarging lens and the illumination is at 75%.

$$E = \frac{X}{I}$$

$$E = \frac{X}{.75}$$

$$E = 1.33X$$

Under these circumstances the required exposure time is 1.33 times the standard exposure time.

EXAMPLE 2

In this case a 2-D negative view is to be exposed at the edge of the field of the enlarging lens and the illumination is at 50%.

$$E = \frac{X}{I}$$

$$E = \frac{X}{.5}$$

$$E = 2X$$

In this case the required exposure time is two times the standard exposure time.

I claim:

1. A three-dimensional printer for printing on lenticular print material a plurality of two-dimensional views of an object taken from different vantage points which comprises a projection light, a negative carrier, projection lens and a linear motion reciprocating blade shutter which is opened and closed by moving means controlled by a computer programmed to vary the speed of the shutter during printing in order to vary the duration of exposure on various parts of the lenticular print material as desired.

2. The three-dimensional printer of claim 1 in which the moving means is a variable speed motor.

3. The three-dimensional printer of claim 2 in which there are moving means for moving the negative carrier to the proper position for printing.

4. The three-dimensional printer of claim 3 in which the moving means for moving the negative carrier is a motor.

5. The three-dimensional printer of claim 3 in which there are moving means for moving the projection lens and moving means for moving the lenticular print material into proper position for printing.

6. The three-dimensional printer of claim 5 in which the moving means for moving the projection lens and the lenticular print material is a motor.

7. The three-dimensional printer of claim 1 where the computer is programmed also to compensate for the vignetting effect of the lenticular screen of the lenticules.

8. The three-dimensional printer of claim 1 in which the computer is programmed so that the duration of exposure of each view in the printing process is for a duration which is the reciprocal of the illumination curve of the projection lens at the position of printing the view in the printer.

9. The three-dimensional printer of claim 1 in which the computer is programmed to vary the speed of the shutter during printing in accordance with the following formula:

$$E = \frac{X}{I}$$

wherein E is the required exposure time for a particular area of a negative offset from the center of the field of the projection lens, X is the standard exposure time of an area of a negative positioned at the center of the field of the lens where the illumination is 100% and I is the illumination of a particular area of the field of illumination of the lens.

10. The three-dimensional printer of claim 4 in which the linear motion reciprocating blade shutter has an aperture of sufficient size so that it is capable of permitting printing as the blade moves in the one direction and also permitting printing as it moves in the opposite direction.

11. The three-dimensional printer of claim 1 in which the computer is programmed to vary the speed of the shutter across the view so as to obtain images of equal density across the lenticular print material.

12. A method of printing on lenticular print material having a plurality of lenticules and a lenticular screen with a plurality of two-dimensional views of an object taken from different vantage points in order to vary the illumination value between various parts of the lenticular print material by utilizing a printer with a projection lens and a linear motion reciprocating blade shutter controlled by a computer which comprises opening the shutter with the projection lens on in order to print a two-dimensional view on the print material and varying the speed of the shutter during printing in order to vary the exposure time on various parts of the lenticular print material as desired and closing the shutter when the two-dimensional view has been printed and repeating the method until all two-dimensional views have been printed.

13. A method of claim 12 in which the computer is programmed also to compensate for the vignetting effect of the lenticular screen of the lenticules.

14. The method of claim 12 in which the computer is programmed so that the duration of exposure across the lenticular print material is substantially the reciprocal of the illumination curve of the projection lens at the position of printing the view in the printer.

15. The method of claim 12 in which the duration of exposure of an area of a view positioned at a particular area of the field of the projection lens is calculated in accordance with the following equation.

$$E = \frac{X}{I}$$

wherein E is the required exposure time for a particular area of a view offset from the center of the field of the lens, X is the standard exposure time of an area of a view positioned at the center of the field of the lens where the illumination is 100% and I is the illumination of a particular area of the field of illumination of the lens;

and the computer directs the movement of the shutter blade in accordance with this equation during the printing of a view.

* * * * *